United States Patent
Rucker et al.

(10) Patent No.: US 11,858,463 B2
(45) Date of Patent: Jan. 2, 2024

(54) SEALED STOWAGE COMPARTMENT FOR A MOTOR VEHICLE, AND MOTOR VEHICLE HAVING SUCH A STOWAGE COMPARTMENT

(71) Applicant: AUDI AG, Ingolstadt (DE)

(72) Inventors: Matthias Rucker, Wettstetten (DE); Klaus Pflaumbaum, Gaimersheim (DE); Ernst Roiger, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 693 days.

(21) Appl. No.: 17/044,514

(22) PCT Filed: Mar. 5, 2019

(86) PCT No.: PCT/EP2019/055380
§ 371 (c)(1),
(2) Date: Oct. 1, 2020

(87) PCT Pub. No.: WO2019/206499
PCT Pub. Date: Oct. 31, 2019

(65) Prior Publication Data
US 2021/0039558 A1    Feb. 11, 2021

(30) Foreign Application Priority Data
Apr. 24, 2018  (DE) .................... 10 2018 206 316.8

(51) Int. Cl.
*B60R 5/02* (2006.01)
*B62D 25/10* (2006.01)
(Continued)

(52) U.S. Cl.
CPC ................ *B60R 5/02* (2013.01); *E05C 3/008* (2013.01); *E05C 3/14* (2013.01); *E05D 7/121* (2013.01);
(Continued)

(58) Field of Classification Search
CPC ...... B60R 5/02; B60R 7/02; B60R 2011/0038; E05Y 2900/536; E05Y 2900/53;
(Continued)

(56) References Cited

U.S. PATENT DOCUMENTS 3,742,741 A    7/1973  Cahan
4,356,594 A *  11/1982 Grosemans ........... E05D 11/082
                                                    16/256
(Continued)

FOREIGN PATENT DOCUMENTS

CN        1313216 A      9/2001
CN      101209734 A      7/2008
(Continued)

OTHER PUBLICATIONS

Communication under Article 94 (3) EPO dated May 24, 2022, in connection with corresponding European Application No. 19710356.7 (10 pp., including machine-generated English translation).

(Continued)

*Primary Examiner* — Gregory A Blankenship
(74) *Attorney, Agent, or Firm* — Maier & Maier, PLLC

(57) ABSTRACT

A stowage compartment for a motor vehicle, wherein the stowage compartment is designed to be arranged underneath a hood element of the motor vehicle, wherein the hood element forms a part of the outer skin of the motor vehicle, wherein the stowage compartment includes: a trough-like container; a cover connectable or connected to the container, wherein the cover is movable relative to the container around a pivot axis between a closed position and an open position, a hinge device, which enables the pivot movement of the cover relative to the container it is provided here that the hinge device is designed in such a way that the cover is automatically held in an arbitrary open position from a minimum opening angle (Wmin) and up to a maximum (Continued)

opening angle (Wmax), and in that the cover automatically moves into a closed position because of gravity below the minimum opening angle (Wmin).

15 Claims, 4 Drawing Sheets

(51) Int. Cl.
*E05C 3/00* (2006.01)
*E05C 3/14* (2006.01)
*E05D 7/12* (2006.01)
*E05D 11/08* (2006.01)
*E05F 1/02* (2006.01)

(52) U.S. Cl.
CPC .............. *E05D 11/084* (2013.01); *E05F 1/02* (2013.01); *B62D 25/10* (2013.01); *E05D 2007/128* (2013.01); *E05D 2011/085* (2013.01); *E05Y 2201/22* (2013.01); *E05Y 2800/40* (2013.01); *E05Y 2800/676* (2013.01); *E05Y 2900/53* (2013.01)

(58) Field of Classification Search
CPC .............. E05Y 2201/22; E05Y 2800/40; E05Y 2800/676; B62D 25/10; E05D 13/12
See application file for complete search history.

(56) References Cited

U.S. PATENT DOCUMENTS

| | | | | |
|---|---|---|---|---|
| 5,294,026 | A * | 3/1994 | McGirt | B60R 7/046 224/482 |
| 6,349,449 | B1 | 2/2002 | Kuehl | |
| 7,614,674 | B2 * | 11/2009 | Shiono | E05B 83/32 296/37.8 |
| 8,528,956 | B1 * | 9/2013 | Winiger | B60R 11/02 296/37.8 |
| 9,440,527 | B1 * | 9/2016 | Maeda | B60K 11/04 |
| 9,527,450 | B1 * | 12/2016 | Bellis | B62D 25/082 |
| 2009/0039679 | A1 | 2/2009 | Karagitz et al. | |
| 2013/0119698 | A1 * | 5/2013 | Patzer | E05D 11/087 296/146.12 |
| 2013/0175821 | A1 | 7/2013 | Simon et al. | |
| 2017/0057416 | A1 * | 3/2017 | Yang | B60R 7/04 |
| 2018/0009387 | A1 * | 1/2018 | Kwon | B60R 7/04 |
| 2020/0108688 | A1 * | 4/2020 | Gruber | H01M 10/656 |
| 2020/0317135 | A1 * | 10/2020 | Liu | B62D 25/087 |
| 2020/0331399 | A1 * | 10/2020 | O'Connor | B60R 7/04 |
| 2021/0039558 | A1 * | 2/2021 | Rucker | E05D 7/12 |
| 2021/0146847 | A1 * | 5/2021 | Fukui | B60N 2/79 |
| 2021/0348425 | A1 * | 11/2021 | Hodgson | E05B 77/12 |
| 2022/0105989 | A1 * | 4/2022 | Cote | B62D 25/12 |
| 2022/0355738 | A1 * | 11/2022 | Gill | B60R 5/02 |
| 2023/0060547 | A1 * | 3/2023 | Mellergård | B60R 21/38 |
| 2023/0192001 | A1 * | 6/2023 | Mellergård | B60R 5/045 296/37.1 |

FOREIGN PATENT DOCUMENTS

| | | |
|---|---|---|
| CN | 204903606 U | 12/2015 |
| CN | 106481176 A | 3/2017 |
| CN | 209776126 U | 12/2019 |
| DE | 197 26 536 A1 | 12/1998 |
| DE | 10 2005 059 264 A1 | 7/2007 |
| DE | 102010018405 A1 | 8/2011 |
| DE | 10 2010 029 102 A1 | 11/2011 |
| DE | 10 2011 122 321 A1 | 6/2013 |
| FR | 2 899 177 A1 | 10/2007 |
| FR | 2 899 177 B1 | 12/2008 |
| KR | 1020050025715 A | 3/2005 |
| WO | 2017054727 A1 | 4/2017 |

OTHER PUBLICATIONS

Office Action dated Mar. 9, 2022, in connection with corresponding Chinese Application No. 2019800276845 (13 pp., including machine-generated English translation).
Chinese Office Action dated Jul. 30, 2021, in connection with corresponding CN Application No. 201980027684.5 (16 pp., including machine-generated English translation).
Examination Report dated Nov. 21, 2018 in corresponding German application No. 10 2018 206 316.8; 10 pages including Machine-generated English-language translation.
International Search Report dated May 8, 2019 in corresponding International application No. PCT/EP2019/055380; 7 pages.
Written Opinion of the International Searching Authority dated May 8, 2019 in corresponding International application No. PCT/EP2019/055380; 10 pages including Machine-generated English-language translation.
Notification of Transmittal of Translation of the International Preliminary Report on Patentability dated Nov. 5, 2020, in connection with corresponding international application No. PCT/EP2019/055380 (6 pages).

* cited by examiner

Fig. 1
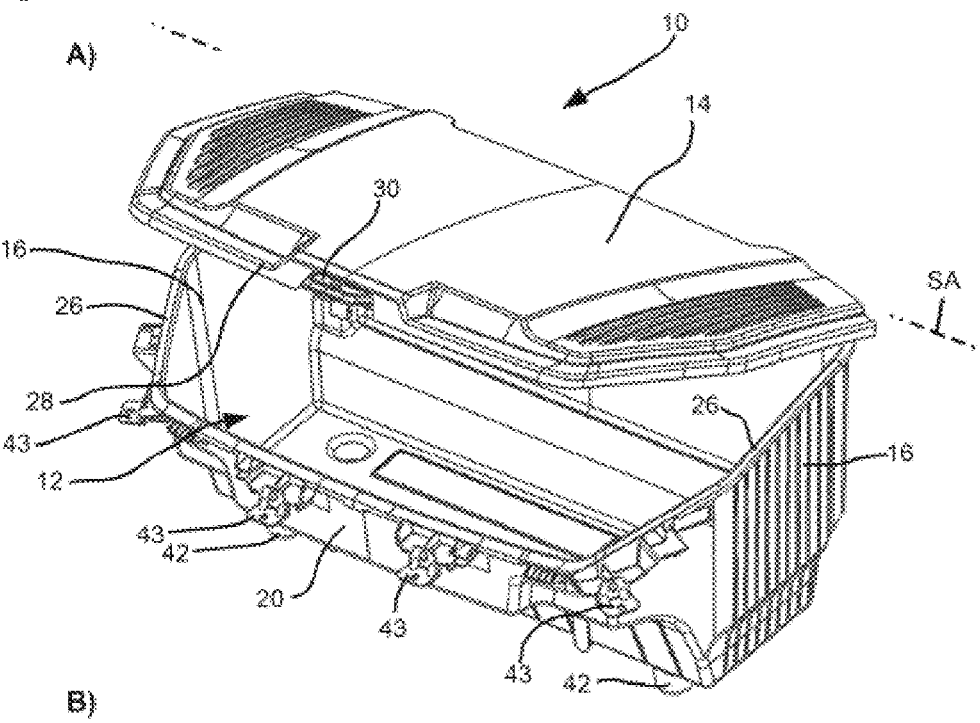
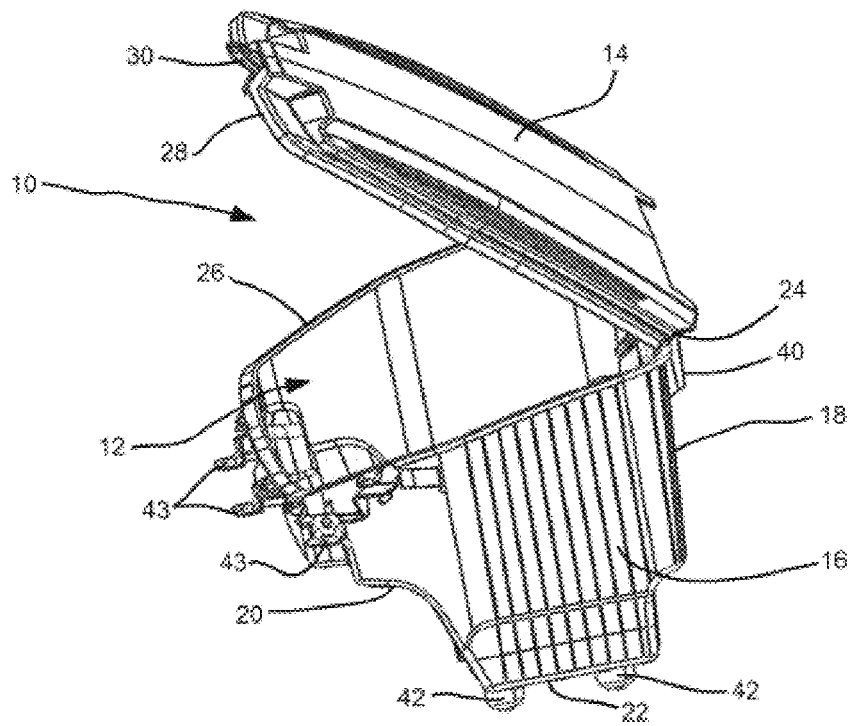

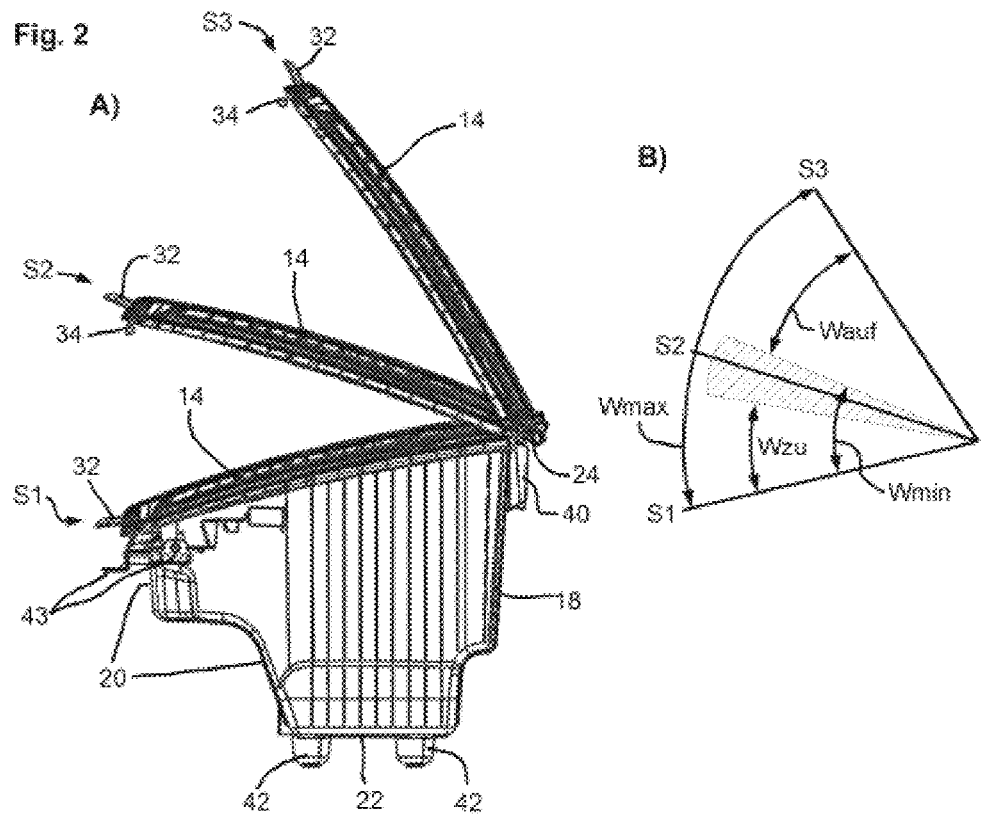
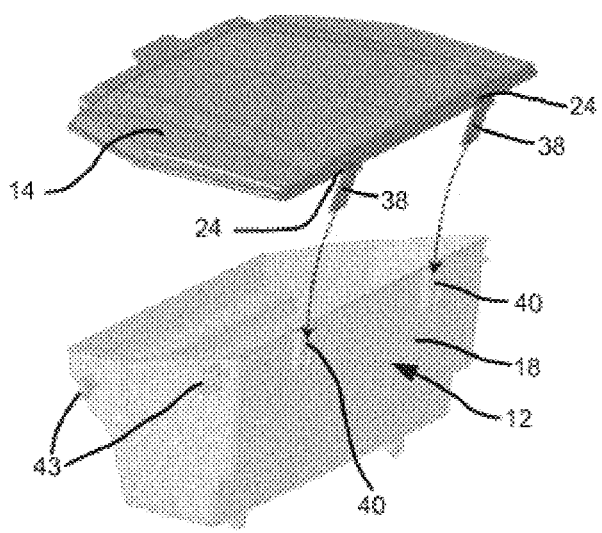

Fig. 4
A)
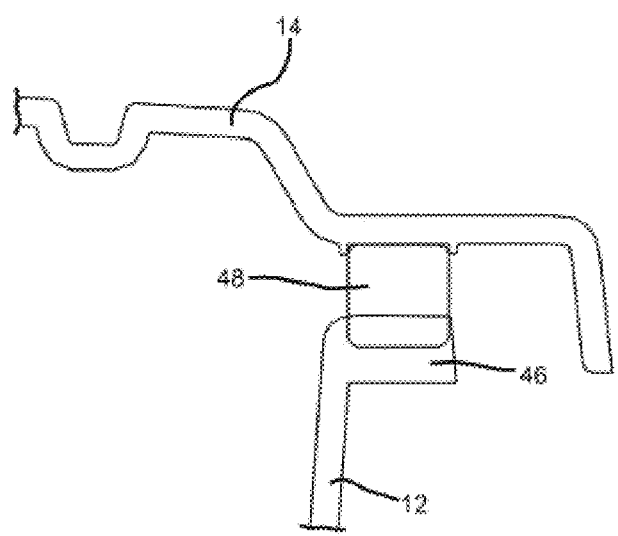
B)
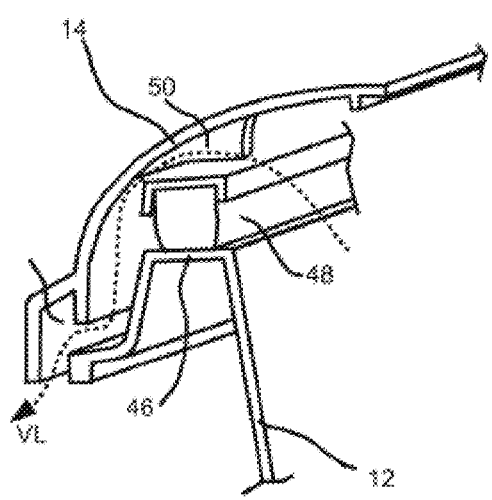

SEALED STOWAGE COMPARTMENT FOR A MOTOR VEHICLE, AND MOTOR VEHICLE HAVING SUCH A STOWAGE COMPARTMENT

FIELD

The disclosure relates to a stowage compartment for a motor vehicle, wherein the stowage compartment is designed to be arranged underneath a hood element of the motor vehicle. Furthermore the disclosure relates to a motor vehicle having such a stowage compartment.

BACKGROUND

In vehicles having a mid-mounted engine or a rear-mounted engine or in electric vehicles, a space under a front flap can be used for a stowage compartment or a baggage compartment. For example, tools, tire changing parts, and electric charging cables for electrified drives can be housed therein. Forming a stowage compartment to be trough-shaped and lining it with a decoration is known, so that a baggage compartment located under the front flap is formed. This baggage compartment is formed by means of a circumferential seal arrangement toward the lower side of the front hood, so that the baggage compartment is sealed off against environmental influences such as moisture, dust, and the like. Furthermore, unsealed trough-like stowage compartments made of plastic are also known, which are accessible by opening the front flap.

An engine hood is known from DE 10 2005 059 264 A1, which has a stowage space arranged pivotably on the inner side of the engine hood for tools, cleaning rags, and the like.

DE 10 2011 122 321 A1 discloses a hood component having a reinforcing element, wherein shaped holes are formed in the reinforcing element, into which a stowage compartment having cover is insertable.

To meet pedestrian protection requirements, it is required that a seal line for front flaps, which cover a baggage compartment, cannot be in an impact region or has to be designed as labile using special measures. This requires special design measures, which increase costs. If the baggage compartment is loaded too strongly, the front flap can be damaged or deformed in sections upon closing of the baggage compartment. The use of unsealed stowage compartments is restricted and correspondingly linked to comfort losses.

SUMMARY

The underlying object of the invention is considered that of providing a stowage compartment for a motor vehicle which avoids the above disadvantages.

Accordingly, a stowage compartment for a motor vehicle is proposed, which is designed to be arranged below a hood element of the motor vehicle, wherein the hood element forms a part of the outer skin of the motor vehicle, wherein the stowage compartment comprises:
a trough-like container, a cover connectable or connected to the container, wherein the cover is movable relative to the container around the pivot axis between a closed position and an open position, and a hinge device which enables the pivot movement of the cover relative to the container. It is provided here that the hinge device is designed in such a way that the cover is automatically held in an arbitrary open position from a minimum opening angle and up to a maximum opening angle, and the cover automatically moves into its closed position because of gravity below the minimum opening angle.

Simple operation of the cover can take place when the hood element is open in this way. In particular, the loading and unloading of the stowage compartment can be carried out safely with open cover. Furthermore, the reliable closing of the stowage compartment is assisted by the automatic closing of the cover below an opening angle which is no longer relevant for the loading or unloading.

The cover can have a locking device, which is designed to releasably lock the cover on the container in its closed position. In this way, it is ensured that the cover reliably rests on the container and closes it in its closed position.

The locking device can have a spring pre-tensioned lever element supported on the cover, having a catch section and an actuating section. In this case, the catch section can be engaged in the closed position of the cover with a corresponding support section of the container, so that the locking device is in a locking position. The cover and the container are thus reliably tensioned and secured in relation to one another in the locking position.

The actuating section can be configured to move the catch section relative to the container and against the spring pre-tension force so that the engagement between the catch section and the support section is released. In this case, the actuating section can be designed like a lever. The actuating section enables smooth and in particular one-handed operation, so that the cover can be opened easily.

The locking device can furthermore be designed to automatically assume the locking position upon the gravity-effectuated closing of the cover. It is thus ensured that the cover is also reliably locked upon the automatic closing below the minimum opening angle. This simplifies the operation, because it is possible to move the cover downward with one hand from an open position until it automatically closes below the minimum opening angle and then is also locked.

The maximum opening angle of the cover can be limited in such a way that an acute angle is formed between an upper side of the cover and a lower side of the hood element when the hood element rests on the maximally open cover. In this way, it is ensured that wedging between the cover and the hood element can be prevented. In particular, the hood element moving downward is applied to the cover and the cover moves from its open position in the direction of the closed position. That is to say, the cover slides with a contact section along the inner side of the hood element until it is located underneath the minimum opening angle, from which the cover automatically falls into its closed position because of gravity and moves away from the hood element.

In the closed position of the cover, a seal arrangement can be provided between the cover and the container along a container edge section facing toward the cover, so that the container is sealed closed by the cover. The seal arrangement can be arranged on the cover and/or on the container edge section. In this way, the interior of the stowage compartment can be protected from environmental influences such as moisture, dust, and the like.

The cover can furthermore have a circumferential cover edge section, which extends downward beyond a container upper edge in the closed position of the cover. Lateral penetration of moisture, dust, and the like is counteracted in this way.

A venting path between the interior of the container and the environment can be formed between an inner side of the cover edge section and an outer side of a container edge section, wherein the venting path is formed in particular by a recess in the seal arrangement. Upon the automatic closing of the cover, this enables the reliable and rapid escape of air from the interior of the container, so that the cover is not prevented from securely closing due to an air cushion.

The hinge device can be a friction hinge. In this way, the desired behavior of the cover with respect to the minimum opening angle or the maximum opening angle can be set.

The container and the cover can be produced from a weather-resistant plastic. This enables the installation below the hood element without the hood element having to be specially sealed.

The hinge device can be connected to the cover and can have a free coupling section facing away from the cover, which is releasably fastened in a corresponding coupling opening on the container, wherein the coupling opening is arranged on an outer side of the container. In particular, the coupling section can be pluggable into the coupling opening. This enables simple assembly of the stowage compartment or the subsequent insertion of the cover when the container is already installed in the motor vehicle.

The above-mentioned object is also achieved by a motor vehicle having a vehicle body, wherein the vehicle body comprises at least one hood element, which covers a stowage space delimited by the vehicle body in a closed state, wherein a stowage compartment having at least one of the above-mentioned features is accommodated in the stowage space.

BRIEF DESCRIPTION OF THE DRAWINGS

Further advantages, features, and details of the invention result from the claims, the following description of preferred embodiments, and on the basis of the drawings. In the figures:

FIG. 1 shows two perspective illustrations of a stowage compartment in partial figures A) and B);

FIG. 2 shows the stowage compartment of FIG. 1 having different opening positions of the cover in partial figure A), shows a schematic illustration of the opening angle in partial figure B), and shows the attachment of a cover to a container of the stowage compartment in partial figure C);

FIG. 4 shows simplified and schematic illustrations in partial section of seal regions between cover and container of the stowage compartment in partial figures A) and B);

DETAILED DESCRIPTION

Figure 3:
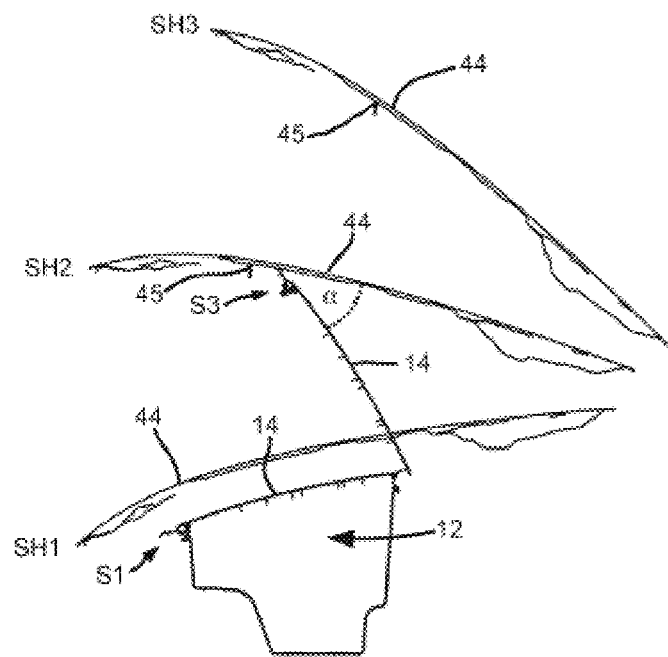
FIG. 3 shows a schematic sectional view of the stowage compartment in relation to a hood element of a motor vehicle.

FIG. 1 shows schematic and simplified perspective illustrations of a stowage compartment 10 from different viewing angles in partial figures A) and B). The stowage compartment 10 comprises a container 12 and a cover 14. The container 12 has two lateral walls 16, a rear wall 18, a front wall 20, and a base 22. The lateral walls 16, the rear wall 18, and the front wall 20 have a respective shaping, which is adapted to an installation location in a motor vehicle (not shown). Accordingly, the shaping shown here for the container 12 is solely by way of example. The container 12 overall has a trough-like design.

The cover 14 is movable in relation to the container 12 around a pivot axis SA. For this purpose, the cover 14 is connected by means of at least one hinge 24 to the container 12. Accordingly, the cover 14 can be moved starting from a closed position, in which it rests on an upper edge section 26 of the container, into different open positions. An operating element 30 is provided on a front edge section 28 of the cover 14. The operating element 30 is designed in particular so that the cover 14 can be moved with one hand from a closed position into an open position.

FIG. 2A shows the stowage compartment 10 of FIG. 1 in a lateral top view. The cover 14 is shown here in the closed position S1, in an intermediate position S2, and in a maximally open position S3. It is apparent from this illustration that the operating element 30 has an actuating section 32 and a locking section 34. The hinge 24 is provided on a rear edge section 36 of the cover 14. The hinge 24 has a coupling section 38 facing away from the cover 14. That is to say, the cover 14 and the coupling section 38 are articulated with one another by means of the hinge. The coupling section 38 is accommodated in a coupling opening 40 formed on the rear wall 18 of the container 12.

FIG. 2C shows an exemplary embodiment of the cover 14 having two hinges 24. A respective coupling section 38 is provided on each hinge 24. Respective coupling openings 40 are formed on the rear wall 18 of the container. As indicated by the dashed arrows, the coupling sections 38 can be inserted or plugged into the coupling openings 40. In the present example, the coupling openings 40 are formed as plug receptacles, into which a respective coupling section 38, which can also be referred to as a plug tab, is insertable and fixable. It is ensured by such a connection between cover 14 and container 12 that the container 12 can be installed independently of the cover 14 in a vehicle body, in particular can be fastened therein, and the cover 14 can subsequently be attached to the container 12 by means of the coupling sections 38 on the container 12, in particular the coupling openings 40.

Nubs 42 formed protruding downward are provided in the region of the base 22 of the container 12. The nubs 42 are used in particular to be able to fasten the container 12 on a part (not shown here) of a vehicle body. In particular, recesses or depressions embodied corresponding to the nubs 42 can be provided on a vehicle body. In addition to the nubs 42, which do not necessarily have to be provided in every conceivable embodiment of a container 12, the container 12 can be connected by means of fastening brackets 43 to the vehicle body. Exemplary arrangements of such fastening brackets 43 are shown in FIGS. 1, 2A, and 2C.

The nubs 42 can also be designed so that liquid possibly located in the container 12, for example water, can be drained off. For this purpose, an opening can possibly be provided in one or more corresponding nubs 42. Such an opening can be closed by means of a removable plug or can simply be left open without closure. In embodiments of the container which do not have nubs 42 as shown here, such an opening can generally be provided as much as possible at a lowest point of the trough-like container 12.

The positions S1, S2, and S3 of the cover 14 illustrated in FIG. 2A are shown schematically and in simplified form once again in FIG. 2B. It is apparent from this illustration that a maximum opening angle Wmax is formed between the closed position S1 and the maximally open position. The maximum opening angle Wmax is approximately 70° to 85°, preferably approximately 75° to 80°. In a range Wauf, the cover 14 is automatically held in the open position by the hinge 24. The angle range Wauf extends, starting from the maximum opening angle Wmax, approximately 35° to 50°, preferably approximately 40° to 45°, in the direction of the closed position S1. In a range Wzu, the cover 14 is not automatically held by the hinge, but rather the cover 14 automatically falls into the closed position because of gravity in this range Wzu. The range Wzu is approximately 15° to 30°, preferably approximately 20° to 25°, starting from the closed position S1. An intermediate range Wm is provided between the ranges Wzu and Wauf. The intermediate range Wm has to be overcome upon opening the cover 14 up to a minimum opening angle Wmin, so that the cover 14 is held by the hinge from this minimum opening angle Wmin up to the maximum opening angle Wmax in any arbitrary open position within the range Wauf. Below the minimum opening angle Wmin, the holding force exerted by the hinge 24 decreases, so that the cover automatically falls into its closed position S1 below the minimum opening angle Wmin, in particular in the range Wzu. The hinge 24 or both hinges 24 can be embodied as friction hinges, which can be adjusted in particular based on the selected angle ranges Wzu, Wauf.

FIG. 3 shows a simplified and schematic sectional illustration of the stowage compartment 10 having container 12 in cover 14. The cover 14 is shown here in the maximally open position S3. Furthermore, a hood element 44 of a vehicle body is shown in FIG. 3. The hood element 44, which is a forward flap or front flap of a vehicle here, is also shown in different positions, in particular a closed position SH1, an intermediate position SH2, and a maximally open position SH3.

In the intermediate position SH2 shown here, the hood element 44 comes into contact with its inner side 45 with the cover 14 of the stowage compartment 10. The contact between hood element 44 and cover 14 can occur in any open position of the cover 14 within the angle range Wauf (see FIG. 2B), in which the cover 14 is held by the hinge 24 in an open position. An acute angle α is formed between the cover 14 and the hood element 44 in such a relative position of these two components in relation to one another. The angle between the cover 14 and the hood element 44 is selected such that the cover 14 is moved downward by the closing hood element 44 in the direction of its closed position S1. If the cover 14 is in its maximally open position S3, the angle α formed between the cover 14 and the hood element 44 is 60° or less, in particular 50° or less. In this way, it is ensured that the cover 14 does not jam as it slides along on the hood element 44, so that both the cover 14 and also the hood element 44 can be moved reliably into their respective closed position S1 or SH1, respectively. Furthermore, it is to be noted that the cover 14 automatically falls into its closed position S1 because of gravity in the angle range Wzu (FIG. 2B). It can therefore be presumed that the cover 14, insofar as it is moved downward by means of the hood element 44, moves rapidly away from the hood element 44 in the angle range Wzu, in particular the cover typically moves downward faster than the hood element 44 in the angle range Wzu.

FIGS. 4A and 4B show simplified and schematic illustrations in partial section of the cover 14 and the container 12, wherein the cover 14 is located in its closed position S1 (FIGS. 2A and 2B). A seal element 48 is provided between an upper edge section 26 and a lower side of the cover 14. The seal element 48 can be provided along the entire upper edge section 26 of the container 12. The seal element 48 can thus be arranged peripherally on the container 12 or peripherally on the cover 14. Furthermore, a peripheral cover edge section 49 can be provided on the cover 14. The cover edge section 49 extends, in the closed position of the cover 14, beyond the upper edge section 26 or the upper edge, on which the seal element 48 rests, of the container 12 downward in the direction of the container 12.

FIG. 4B shows a possible embodiment in which a venting channel 50 is formed above the seal element 48, through which air VL displaced from the interior of the stowage compartment 10 can escape, in particular upon closing of the cover 14. The venting channel 50 is embodied in particular so that it forms a type of labyrinth seal, so that penetration of water or dirt from the surroundings into the closed stowage compartment 10 can be nearly completely prevented.

Alternatively to a venting channel 50, providing at least one recess or a notch on the seal element 48 can also be considered, through which the displaced air can escape from the interior of the stowage compartment upon closing of the cover. Such a recess can be provided, for example, at multiple points along the seal element 48. The recesses can be dimensioned here in such a way that the air volume to be displaced can escape reliably and the penetration of water or dirt through these recesses can be nearly completely avoided.

Figure 5:
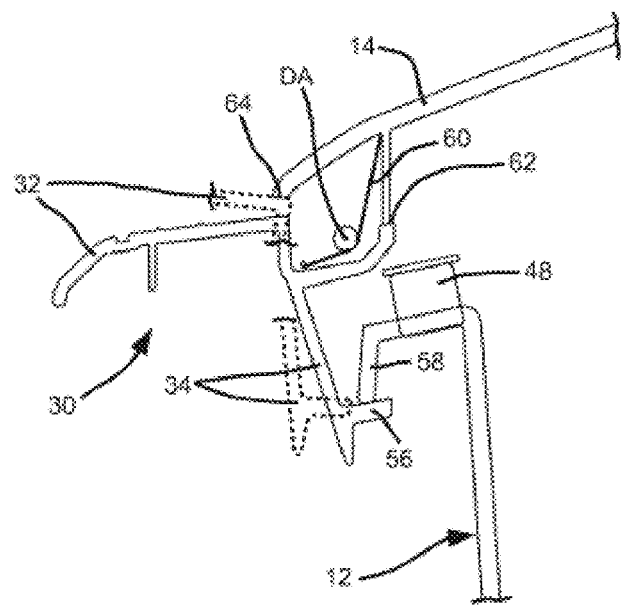
FIG. 5 shows a simplified and schematic sectional illustration of an actuating element.

FIG. 5 shows the operating element 30 in a simplified and schematic sectional illustration. The operating element 30 is formed like a lever and has the actuating section 32 and the catch section 34. The actuating section 34 extends forward in relation to the cover 14. The catch section 34 extends downward in relation to the cover 14. A catch element 56 is provided on the catch section 34, which is engaged in the locking position shown here with a corresponding catch projection 58 formed on the container 12. The operating element 30 is movable around an axis of rotation DA, so that it can be moved from the locking position into an unlocking position. The unlocking position is shown by dashed lines. The operating element 30 is pre-tensioned in its locking position by means of a spring arrangement 60. That is to say, after unlocking an opening of the cover 14, the operating element 30 is moved in relation to the cover 14 back into the position shown in FIG. 5. If the cover 14 is closed, the catch element 56 slides downward on the outside along the catch projection 58. At the same time, the operating element 30 is pivoted against the spring pre-tension force of the spring arrangement 60 around the axis of rotation DA. As soon as the catch element 56 has slid past the catch projection 58 downward, the catch element 56 engages along the lower side of the catch projection 58 due to the spring force. The movement of the operating element 30 around the axis of rotation DA is restricted by two cover-side stops 62, 64, against which the operating element can rest in the locking position or the unlocking position. For the sake of completeness, the seal element 48 is also shown in FIG. 5. The cover 14 can be unlocked and opened with one hand by means of the operating element 30, in particular pivoted upward into an open position. During the automatic closing of the cover 14, automatic locking of the cover 14 on the container 12 additionally takes place, so that the stowage compartment 10 is covered reliably and sealed at all times when the hood element 44 is closed.

The invention claimed is:

1. A stowage compartment for a motor vehicle, wherein the stowage compartment is designed to be arranged underneath a hood element of the motor vehicle, wherein the hood element forms a part of an outer skin of the motor vehicle, wherein the stowage compartment comprises:
   a trough-like container, a cover connectable or connected to the container, wherein the cover is movable relative to the container around a pivot axis between a closed position and an open position, and a hinge device, which enables pivoting movement of the cover relative to the container, wherein the hinge device is designed in such a way that the cover is automatically held in an arbitrary open position when disposed between a minimum opening angle and a maximum opening angle, and such that the cover automatically moves into a gravity-effectuated closed position when disposed below the minimum opening angle, and wherein the maximum opening angle of the cover is delimited in such a way that an acute angle is formed between an upper side of the cover and a lower side of the hood element when the hood element rests on the maximally open cover.

2. The stowage compartment as claimed in claim 1, wherein the cover has a locking device, which is designed to releasably lock the cover in the closed position on the container.

3. The stowage compartment as claimed in claim 2, wherein the locking device has a spring-pretensioned lever element supported on the cover, having a catch section and an actuating section.

4. The stowage compartment as claimed in claim 3, wherein the catch section, in the closed position of the cover, is engaged with a corresponding support section of the container, so that the locking device is in a locking position.

5. The stowage compartment as claimed in claim 4, wherein the actuating section is designed to move the catch section relative to the container and against the spring pre-tension force, so that the engagement between the catch section and the support section is released.

6. The stowage compartment as claimed in claim 4, wherein the locking device is designed to assume the locking position automatically upon gravity-effectuated closing of the cover.

7. The stowage compartment as claimed in claim 1, wherein, in the closed position of the cover, a seal arrangement is provided between the cover and the container along a container edge section facing toward the cover, so that the container is tightly closed by the cover.

8. The stowage compartment as claimed in claim 7, wherein the seal arrangement is arranged on the cover and/or on the container edge section.

9. The stowage compartment as claimed in claim 1, wherein the cover has a circumferential cover edge section, which extends downward beyond a container upper edge in the closed position of the cover.

10. The stowage compartment as claimed in claim 9, wherein a venting path between an interior of the container and surroundings of the container is formed between an inner side of the cover edge section and an outer side of a container edge section, and wherein the venting path is formed by a recess in the seal arrangement.

11. The stowage compartment as claimed in claim 1, wherein the hinge device is a friction hinge.

12. The stowage compartment as claimed in claim 1, wherein the container and the cover are formed from a weather-resistant plastic.

13. The stowage compartment as claimed in claim 1, wherein the hinge device is connected to the cover and has a free coupling section facing away from the cover, which is releasably fastened in a corresponding coupling opening on the container, and wherein the coupling opening is arranged on an outer side of the container.

14. A stowage compartment for a motor vehicle, wherein the stowage compartment is designed to be arranged underneath a hood element of the motor vehicle, wherein the hood element forms a part of an outer skin of the motor vehicle, wherein the stowage compartment comprises:

a trough-like container, a cover connectable or connected to the container, wherein the cover is movable relative to the container around a pivot axis between a closed position and an open position, and a hinge device, which enables pivoting movement of the cover relative to the container, wherein the hinge device is designed in such a way that the cover is automatically held in an arbitrary open position from a minimum opening angle and up to a maximum opening angle, and in that the cover automatically moves into a gravity-effectuated closed position below the minimum opening angle, wherein the cover has a circumferential cover edge section, which extends downward beyond a container upper edge in the closed position of the cover, and wherein a venting path between an interior of the container and surroundings of the container is formed between an inner side of the cover edge section and an outer side of a container edge section, wherein the venting path is formed by a recess in the seal arrangement.

15. A stowage compartment for a motor vehicle, wherein the stowage compartment is designed to be arranged underneath a hood element of the motor vehicle, wherein the hood element forms a part of an outer skin of the motor vehicle, wherein the stowage compartment comprises:

a trough-like container, a cover connectable or connected to the container, wherein the cover is movable relative to the container around a pivot axis between a closed position and an open position, and a hinge device, which enables pivoting movement of the cover relative to the container, wherein the hinge device is designed in such a way that the cover is automatically held in an arbitrary open position from a minimum opening angle and up to a maximum opening angle, and in that the cover automatically moves into a gravity-effectuated closed position below the minimum opening angle, and wherein the hinge device is connected to the cover and has a free coupling section facing away from the cover, which is releasably fastened in a corresponding coupling opening on the container, wherein the coupling opening is arranged on an outer side of the container.

* * * * *